United States Patent
Bittmann

[11] Patent Number: 5,788,150
[45] Date of Patent: Aug. 4, 1998

[54] MOTOR VEHICLE HEATER

[75] Inventor: Michael Bittmann, München, Germany

[73] Assignee: Webasto Thermosysteme GmbH, Stockdorf, Germany

[21] Appl. No.: 618,261

[22] Filed: Mar. 18, 1996

[30] Foreign Application Priority Data

Mar. 17, 1995 [DE] Germany .................. 195 09 780.7

[51] Int. Cl.⁶ ................................................. B60H 1/02
[52] U.S. Cl. ............................... 237/12.3 C; 165/169
[58] Field of Search ....................... 237/12.3 C; 165/169

[56] References Cited

U.S. PATENT DOCUMENTS

| | | | |
|---|---|---|---|
| 4,590,888 | 5/1986 | Mosig | 237/12.3 C |
| 4,944,454 | 7/1990 | Widemann et al. | 237/12.3 C |
| 4,976,463 | 12/1990 | Soo | 237/12.3 C |
| 5,016,446 | 5/1991 | Fiedler | 62/342 |
| 5,046,663 | 9/1991 | Bittmann | 237/12.3 C |
| 5,050,796 | 9/1991 | Raethel et al. | 237/12.3 C |
| 5,205,250 | 4/1993 | Easterly et al. | 237/12.3 C |

*Primary Examiner*—William E. Tapolcal
*Attorney, Agent, or Firm*—Sixbey, Friedman Leedom & Ferguson; David S. Safran

[57] ABSTRACT

A motor vehicle heating device with a burner which has a combustion chamber which is coaxially surrounded, at least in part, by a heat exchanger which has a closed end at an end of the combustion chamber opposite that at which the burner is located, and which has an annular space, which is defined between an outer wall and inner wall, through which a liquid heat transfer agent flows. The heat exchanger is made of a one-piece construction, so that the end of the heat exchanger joins its outer and inner walls, and at the same time, its inside faces the combustion chamber. By this construction, the liquid-carrying part is essentially formed by a single part, so that no integrity problems can occur between the liquid-carrying annular space and the exhaust gas-carrying interior of the heating device and production costs are reduced.

12 Claims, 2 Drawing Sheets

1

MOTOR VEHICLE HEATER

BACKGROUND OF THE INVENTION

1. Field of the Invention

The invention relates to a motor vehicle heating device with a burner which has a combustion chamber which is coaxially surrounded, at least in part, by a heat exchanger which has a closed end at an end of the combustion chamber opposite that at which the burner is located, and which has an annular space, which is defined between an outer wall and inner wall, through which a liquid heat transfer agent flows.

2. Description of Related Art

A heating device of this type is disclosed in U.S. Pat. No. 4,944,454. In this heating device, the annular space of a heat exchanger through which the liquid heat transfer agent flows is formed by the inner wall of a first housing part and by the outer wall of a second housing part. In order to form liquid-tight connections between these two housing parts which also withstand cyclic temperature stresses, high production costs are incurred for producing necessary very narrow tolerances and a high sealing.

SUMMARY OF THE INVENTION

The primary object of the present invention is to reduce the production and installation cost for a motor vehicle heating device.

This object is achieved by the heat exchanger being made in one piece, so that the end of the heat exchanger joins its outer and inner walls, and at the same time, its inside faces the combustion chamber. By this construction, the liquid-carrying part is essentially formed by a single part, so that no integrity problems can occur between the liquid-carrying annular space and the exhaust gas-carrying interior of the heating device. Compared to the prior art in which, for the two housing parts which surround the annular space and through which the heat exchange agent flows, two different tools with the correspondingly increased production cost and logistical cost were necessary, with the present invention the cost is clearly reduced by the integrated design of the heat exchanger with the hollow jacket through which the heat transfer agent flows.

According to one advantageous embodiment, the heat exchanger is formed by a casting. Both with respect to good heat transfer properties as well as low weight, which is desirable because of use in motor vehicles, formation as a lightweight metal die casting is especially advantageous.

Since, in contrast to the prior art, the liquid heat transfer agent does not flow through the end of this heat exchanger, it is advantageous if it has a greater wall thickness than the wall thickness of the inner wall or the outer wall.

To achieve a configuration producing good heat transfer from the end to the inner wall of the heat exchanger, it is advantageous if the wall thickness of the inner wall increases continuously in the transition area to the end. The resulting slant acts advantageously at the same time for mold removal in production as a casting.

To increase the amount of heat transferred from the flue gases to the liquid heat transfer agent, it is advantageous if the inner wall of the heat exchanger, in the conventional manner, is provided with ribs which run longitudinally on its inside, facing the combustion chamber.

It is, furthermore, advantageous for a further increase of the integration density of the heat exchanger part, if at least one connection piece for passage of the liquid heat transfer agent is molded on the outer wall.

The amount of heat transferred to the liquid heat transfer agent is also increased when a spiral-shaped guide element, which forces the liquid heat exchange agent to take an extended path around and through the heat exchanger, is inserted into the annular space between the inner and outer heat exchanger walls.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
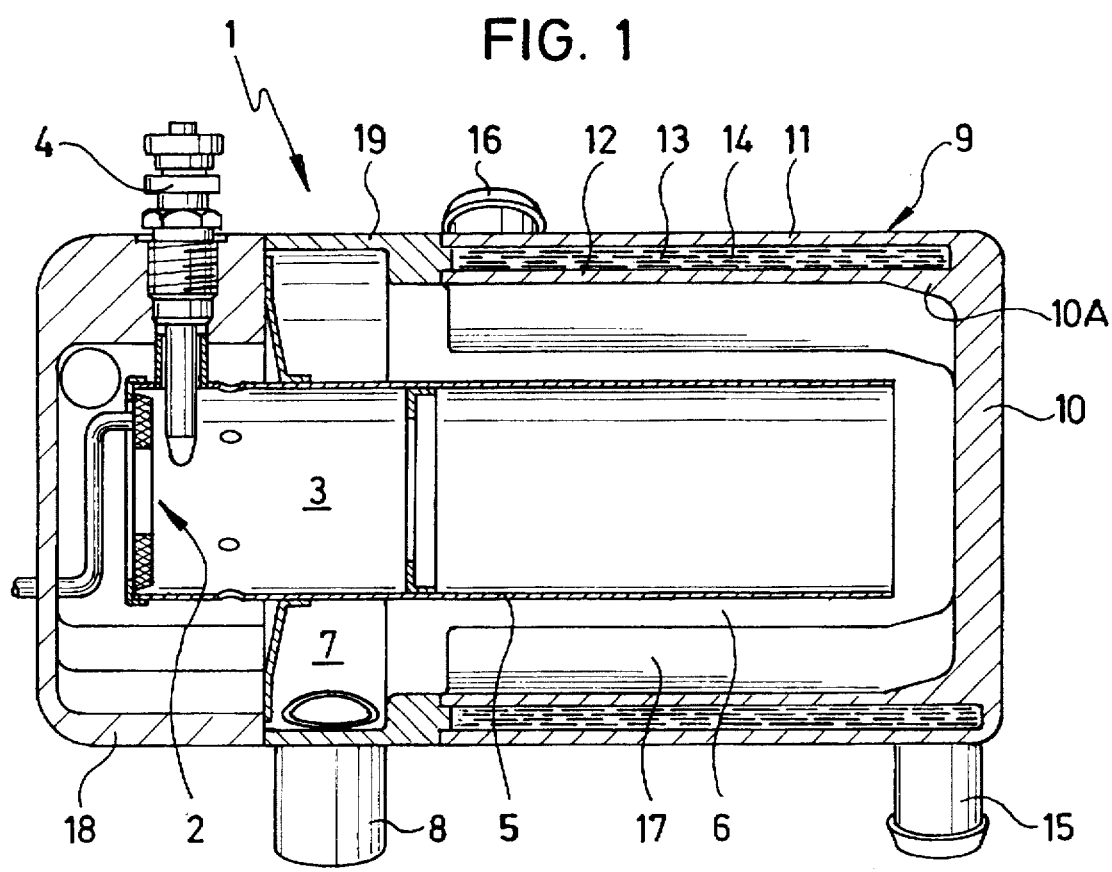
FIG. 1 is a longitudinal sectional view through a heating device with a one-piece heat exchanger in accordance with a first embodiment of the invention.

A motor vehicle heating device 1 has a burner 2 in which liquid fuel and combustion air are formed into a combustible mixture in a combustion chamber 3 and are ignited by an ignition means 4 to form a flame. Combustion chamber 3 is surrounded by a combustion pipe 5 which is open at both ends. The hot combustion gases formed during combustion are re-routed after emerging from combustion pipe 5 and then pass along its outside through an exhaust gas channel 6, which discharges into annular collector space 7, from which they exit via an exhaust connection pipe 8 into the open.

Combustion pipe 5 is surrounded over a large part of its length by a heat exchanger 9. Heat exchanger 9 is made as a one-piece, lightweight metal die casting having an end 10 from which a double-walled cylindrical part extends which is formed by an outer wall 11 and an inner wall 12 which define between them an annular space 13, through which a liquid heat transfer agent 14 flows. Heat transfer agent 14 is supplied via an inlet connection piece 15 and is discharged via an exit connection piece 16 into the heating circuit of the motor vehicle, being heated on its route through the annular space 13 by means of the heat energy removed from the exhaust gases. To improve heat transfer, the inside of inner wall 12, which faces combustion pipe 5, is provided with ribs 17 which run along its length.

In the part which is used to form the fuel-air mixture, the motor vehicle heating device is surrounded by a burner head part 18 which serves as a housing. Between the burner head part 18 and the heat exchanger 9, there is an intermediate housing 19 in which a collector space 7 is provided for collecting the exhaust gases and on which an exhaust connection piece 8 is located.

Figure 2:
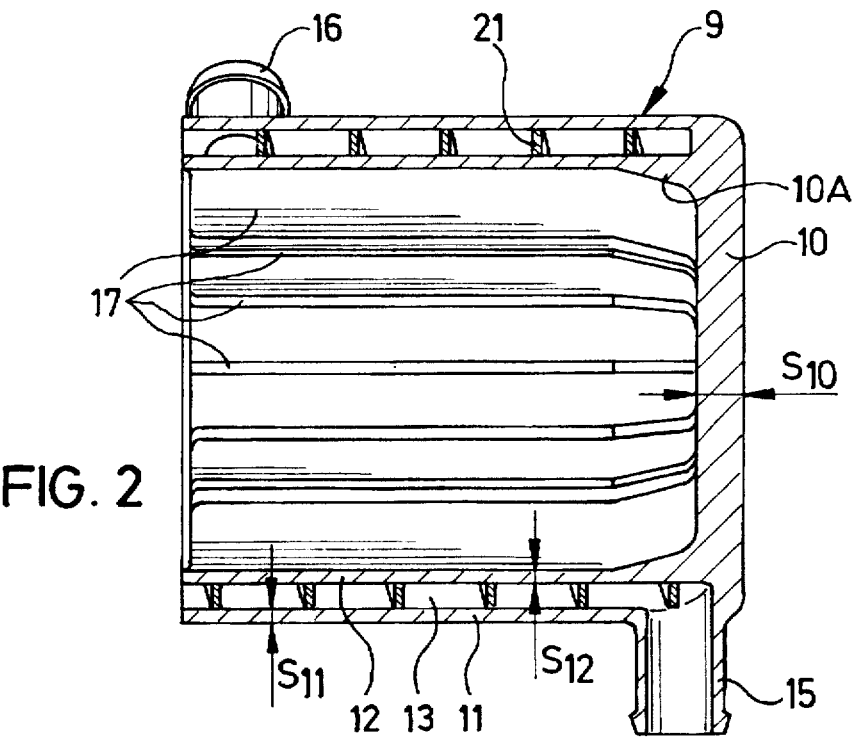
FIG. 2 is a sectional view of the heat exchanger of FIG. 1 with a guide element inserted.

As is apparent from FIG. 2, end 10 of the heat exchanger 9 has a wall thickness $S_{10}$ which is greater than wall thickness $S_{11}$ of outer wall 11 and wall thickness $S_{12}$ of inner wall 12 of heat exchanger 9. This reinforcement of end 10 is used for improved heat dissipation to the outer wall 11 or the inner wall 12, so that end 10 is reliably prevented from burning through, even for more prolonged operation with full heat output. Heat transfer is, furthermore, improved by the fact that the wall thickness $S_{12}$ of inner wall 12 continuously increases in transition range 10A in a direction toward end 10. The slant which is formed by the continuous transition, at the same time, facilitates removal of the heat exchanger 9 from the mold in which it is formed during the casting process.

To improve heat transfer from the exhaust gas to the liquid heat transfer agent 14, a spiral-shaped guide element 21 is inserted into the annular space 13 of heat exchanger 9, and element 21 imposes an elongated spiral path on the liquid heat transfer agent 14 as it passes from inlet connection piece 15 to outlet connection piece 16; in the course of this path, a larger amount of heat energy can be absorbed from the exhaust gas than in simple axial flow through annular space 13.

Figure 3:
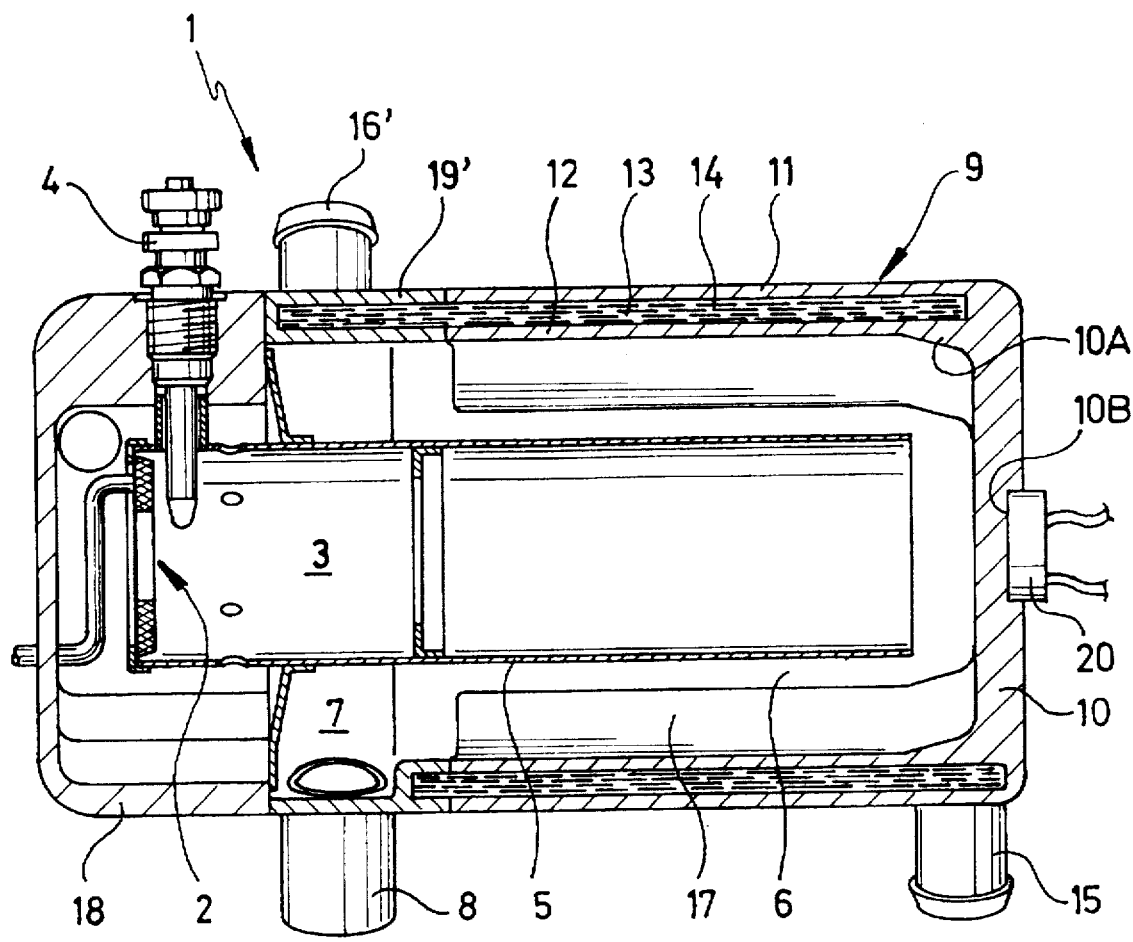
FIG. 3 is a longitudinal sectional view through a heating device with a second embodiment of a heat exchanger.

While, in the first embodiment according to FIGS. 1 and 2, liquid heat transfer agent 14 moves solely in annular space 13 of heat exchanger 9, in an alternative embodiment according to FIG. 3, the intermediate housing 19' is also made of double-walled construction; in its interior, it contains collector space 7 for collecting the combustion gases and discharging them via exhaust connection piece 8, and which has outlet connection piece 16' for the liquid heat transfer agent in the area of its double outer wall. In this design, annular space 13 is extended into intermediate housing 19', by which a higher efficiency of the heating device overall can be achieved. In this embodiment, furthermore, on the outside of end 10 there is sensor 20 which measures the temperature in the area of end 10, and advantageously, transmits it to a control device (not shown) for controlling the heat output by a correspondingly controlled fuel and combustion air supply, so that end 10, as a critical part, is not exposed to overheating. Holding space 10B for sensor 20 is, advantageously, molded directly into end 10. This sensor 20 can, of course, also be used, likewise, in the first embodiment.

By means of the design of the motor vehicle heating device according to the invention, the production and installation cost thereof is greatly reduced, by which production costs overall are much lower.

I claim:

1. Motor vehicle heating device having a burner at a first end of a combustion chamber, a heat exchanger which coaxially surrounds the combustion chamber, at least in part, and has a closed end at an opposite end of the combustion chamber from that at which the burner is located; wherein the heat exchanger has an annular space through which a liquid heat transfer agent flows which is defined between an outer wall and an inner wall of the heat exchanger; wherein the heat exchanger is made of a one-piece construction in which the closed end of the heat exchanger is joined to both the outer wall and the inner wall; and wherein an inner side of said closed end directly faces the combustion chamber.

2. Motor vehicle heating device according to claim 1, wherein the heat exchanger is formed of a cast part.

3. Motor vehicle heating device according to claim 2, wherein the cast part is a metal die casting.

4. Motor vehicle heating device according to claim 1, wherein the end of the heat exchanger has a greater wall thickness than a wall thickness of each of the inner wall and the outer wall.

5. Motor vehicle heating device according to claim 4, wherein the wall thickness of the inner wall increases continuously in a transition area to the closed end.

6. Motor vehicle heating device according to claim 1, wherein the inner wall of the heat exchanger is provided with ribs which run in a lengthwise direction of the heat exchanger along a side of the inner wall which faces the combustion chamber.

7. Motor vehicle heating device according to claim 1, wherein at least one connection piece for passage of the liquid heat transfer agent is molded on said outer wall of the heat exchanger.

8. Motor vehicle heating device according to claim 1, wherein a spiral-shaped guide element is disposed in said annular space.

9. Motor vehicle heating device according to claim 1, wherein a holding space for a temperature sensor for controlling heat output is molded directly in said closed end of the heat exchanger.

10. Motor vehicle heating device according to claim 1, wherein the burner is disposed in a housing part of the heating device and said heat exchanger is connected to the housing part via an intermediate housing, said intermediate housing having an exhaust gas collection area for receiving exhaust gas deflected by said closed end from said combustion chamber into an exhaust gas channel defined between the heat exchanger, and having a combustion chamber outlet part for directing said exhaust gases from said collection chamber out of the heating device.

11. Motor vehicle heating device according to claim 10, wherein the intermediate housing has an inner wall and an outer wall which define an annular space therebetween which opens into the annular space between the inner and outer walls of the heat exchanger.

12. Motor vehicle heater according to claim 3, where the metal of which the die casting is formed is a lightweight metal.

* * * * *